US008357272B2

(12) United States Patent
Itoh et al.

(10) Patent No.: US 8,357,272 B2
(45) Date of Patent: Jan. 22, 2013

(54) QUANTUM DOT MANIPULATING METHOD AND QUANTUM DOT PRODUCTION/MANIPULATION APPARATUS

(75) Inventors: Tadashi Itoh, Toyonaka (JP); Masaaki Ashida, Ibaraki (JP); Hajime Ishihara, Minoh (JP); Takuya Iida, Miki (JP)

(73) Assignee: Japan Science and Technology Agency, Saitama (JP)

( * ) Notice: Subject to any disclaimer, the term of this patent is extended or adjusted under 35 U.S.C. 154(b) by 723 days.

(21) Appl. No.: 12/379,583

(22) Filed: Feb. 25, 2009

(65) Prior Publication Data

US 2009/0255807 A1    Oct. 15, 2009

Related U.S. Application Data

(62) Division of application No. 10/592,491, filed as application No. PCT/JP2005/004118 on Mar. 9, 2005, now Pat. No. 7,662,731.

(30) Foreign Application Priority Data

Mar. 12, 2004    (JP) ................................. 2004-071621

(51) Int. Cl.
    *C23C 14/34*    (2006.01)
(52) U.S. Cl. ......... 204/298.26; 204/298.01; 204/298.02; 204/298.21
(58) Field of Classification Search ............. 204/298.01, 204/298.02, 298.09, 298.21, 298.26
See application file for complete search history.

(56) References Cited

U.S. PATENT DOCUMENTS

| 5,348,687 | A | 9/1994 | Beck et al. |
| 6,090,666 | A | 7/2000 | Ueda et al. |
| 6,239,453 | B1 * | 5/2001 | Yamada et al. ................. 257/79 |
| 2001/0019774 | A1 | 9/2001 | Suzuki et al. |
| 2001/0031564 | A1 * | 10/2001 | Suzuki et al. ................. 438/962 |

FOREIGN PATENT DOCUMENTS

| JP | 64-34439 | 2/1989 |
| JP | 6-71164 | 3/1994 |
| JP | 8-189465 | 7/1996 |
| JP | 9-102596 A | 4/1997 |
| JP | 9-148121 A | 6/1997 |
| JP | 2001-316501 A | 11/2001 |
| JP | 2003-160336 A | 6/2003 |
| JP | 2003-200399 | 7/2003 |
| JP | 2003-200399 A | 7/2003 |

(Continued)

OTHER PUBLICATIONS

International Search Report of PCT/JP2005/004118, mailed Jun. 21, 2005.

(Continued)

*Primary Examiner* — Keith Hendricks
*Assistant Examiner* — Jason M Berman
(74) *Attorney, Agent, or Firm* — Nixon & Vanderhye PC

(57) ABSTRACT

A quantum dot manipulating method and a generation/manipulation apparatus are provided which can control the size of a large number of generated quantum dots on or below the order of percent which is required for optical applications of the dots.

Quantum dots are generated by shining a dot production laser (4a) onto a solid object (3) in a quantum dot production/manipulation apparatus (1) containing superfluid helium (7) therein. A dot manipulation laser (5a) is shone onto the generated quantum dots to manipulate the quantum dots.

10 Claims, 2 Drawing Sheets

FOREIGN PATENT DOCUMENTS

| | | |
|---|---|---|
| JP | 2004-48062 A | 2/2004 |
| WO | 03/007385 A | 1/2003 |

OTHER PUBLICATIONS

Takuya Iida et al., "Ryoshi Rikigakuteki Kyomei Jokenka ni Okeru Nano Busshitsu Hikari Manipulation: Ekitai Helium-Chu deno Sosani Taisuru Kosatsu", Dai 14 Kai Kobutsusei Kenkyukai Ronbunshu, Kobutsusei Kenkyukai, 2003 Nen 12 Gatsu, pp. 303-306.

Michitaka Takami, "Cho Ryudo Helium-chu de Genshi ya Bunshi no Furumai o Miru", Riken Nyusu, The Institute of Physical and Chemical Research, No. 213, pp. 2-5 (1999).

"Theory of Quanrum Nano Optical Chromatography", T. Iida et al.,Proceedings for 61$^{st}$ Annual Conference of Japanese Association of Physics 27aWA-4, published and issued on Mar. 4, 2006, p. 715.

"Fabrication and optical manipulation of CuCI nanoparticles in superfluid helium", K. Inaba et al., Proceedings for 61$^{St}$ Annual Conference of Japanese Association of Physics 27aWA-5, published and issued on Mar. 4, 2006.

"Theory of selective manipulation of nano materials by quantum nano optical chromatography", T Iida et al, Proceedings for 67$^{th}$ Academic Conference of Japanese Association of Applied Physics Autumn 2006; 29p-T-2, Lecture Scheduled Aug. 29, 2006.

"Fabrication and optical manipulation of quantum dots in superfluid helium", K. Inaba et al., Proceedings for 67$^{th}$ Academic Conference of Japanese Association of Applied Physics Autumn 2006 29-T-3, Lecture Scheduled Aug. 29, 2006.

"Optical Manipulation of Nano Materials under Quantum Mechanical Resonance Conditions", T. Iida et al., IEICE Transelectron. "Special Section on Nanophotonics and Related Techniques", vol. E88-C, No. 9) Sep. 2005, p. 1809-1816.

"Optically induced mechanical interaction between semiconductor quantum dots under an electronic resonance condition", T.. Iida et al., Physica E 26(2005). p. 163-168.

"Optically induced force between nano-particles irradiated by electronic resonant light", T. Iida et al., Journal of Luminescence 112(2005), p. 151-155.

"Radiation force induced by resonant light: from atom to nanoparticle", T. Iida et al., Journal of Luminescence 108(2004), p. 351-354.

"Optical patterning and photochemical fixation of polymer nanoparticles on glass substrates", S. Ito et al., Applied Physics Letters vol. 78 No. 17, Apr. 23, 2001, p. 2566-2568.

"Comment on 'Theoretical Study of the Optical Manipulation of Semiconductor Nanoparticles under an Excitonic Resonance Condition'", Physical Review Letters, vol. 92 No. 8, Feb. 27, 2004, 089701-1.

"Optical trapping near resonance absorption", Rodney R. Agayan et al., Applied Optics. vol. 41 No. 12, Apr. 20, 2002, p. 2318-2327.

"Optical Trapping and Manipulation of Nano-objects with an Apertureless Probe", Patrick C. Chaumet et al., Physical Review Letters, vol. 88 No. 12, Mar. 25, 2002, 123601-1-123601-4.

"Laser manipulation and fixation of single gold nanoparticles in solution at room temperature", S. Ito et al., Applied Physics Letters vol. 80 No. 3, Jan. 21, 2002, p. 482-484.

"Theoretical Study of the Optcal Manipulation of Semiconductor Nanoparticics under an E'ccitonjc Resonance Condition", T. Iida et al., Physical Review Letters, vol. 90 No. 5, Feb. 7, 2003, 057403-I-057403-4.

"Structure and Stability of Silver Nanoparticles in Aqueous Solution Produced by Laser Ablation", F Mafune et al., The Journal of Physical Chemistry, vol. 104 No. 35, Sep. 7, 2000, p. 8333-8337.

"Implantation of Neutral Atoms into Liquid Helium by Laser Sputtering", A. Fujisaki et al., Physical Review Letters, vol. 71 No. 7, Aug. 16, 1993, p. 1039-1042.

"Formation of Stable Platinum Nanoparticles by Laser Ablation in Water", F. Mafune et al., J. Phys. Chem. B 2003, 107, p. 4218-4223.

"Photoluminescence of ZnO Nanoparticles Prepared by Laser Ablation in Different Suifactant Solutions", H. Usui et al., J. Phys. Chem. B 2005, 109, p. 120-124.

"Full Physical Preparation of Size-Selected Gold Nanoparticles in Solution: Laser Ablation and Laser-Induced Size Control", F. Mafune et a]., The Journal of Physical Chemistry, vol. 106 No. 31, Aug. 8, 2002, p. 7575-7577.

"Spectroscopy of Alkali Atoms and Molecules in Superfluid Helium", Y. Takahashi et al., Physical Review Letters, vol. 71 No. 7, Aug. 16, 1993, p. 1035-1038.

"Selective adsorption and patterning of Si nanoparticles fabricated by laser ablation on functionalized self-assembled monolayer", K. Hata et al., Applied Physics Letters vol. 79 No. 5, Jul. 30, 2001, p. 692-694.

"Iida and Ishihara Reply", Physical Review Letters, vol. 92 No. 8, Feb. 27, 2004, 089702-1.

"Optical manipulation of nano objects under the quantum mechanical resonance conditions: Study for the manipulation in the liquid helium", T. Iida et al., Collected papers for the 14$^{th}$ Seminar on Photomaterial Science, Dec. 5-6, 2006.

"Research Frontline: Observing Behavior of Atoms and Molecules in Superfluid Helium", Riken News, No. 213, Mar. 1999.

U.S. Patent & Trademark Office, Office Action for U.S. Appl. No. 10/592,491 dated May 28, 2009.

Office Action for Japanese Patent Application 2006-510966, dated Dec. 21, 2010, together with an English translation.

\* cited by examiner

QUANTUM DOT MANIPULATING METHOD AND QUANTUM DOT PRODUCTION/MANIPULATION APPARATUS

This application is the U.S. national phase of international application No. PCT/JP2005/004118, filed 9 Mar. 2005, which designated the U.S. and claims priority of JP 2004-071621, filed 12 Mar. 2004, the entire contents of each of which are hereby incorporated by reference.

This application is a division of application Ser. No. 10/592,491 filed on Sep. 12, 2006 now U.S. Pat. No. 7,662,731.

TECHNICAL FIELD

The present invention relates to a quantum dot manipulating method and a quantum dot production/manipulation apparatus and in particular, to a quantum dot manipulating method to produce, preferably, semiconductor quantum dots in superfluid helium and manipulate the quantum dots with light and a quantum dot production/manipulation apparatus capable of implementing the manipulating method.

BACKGROUND ART

A lot of research work is in progress to investigate, and find applications (e.g., super low threshold laser and quantum entanglement) for the peculiar physical properties of quantum dots (especially, semiconductor quantum dots) as a typical example of nanosized structures.

Typically, quantum dots are produced by (1) self-assembly into particles in chemical reaction or (2) MBE. The latter is a method of growing an extremely thin crystal film (equivalent to a thickness of a few atoms) on a wafer of a different semiconductor, such as silicon.

It is expected that the quantum dot will find applications in wide ranges of fields from computer-related fields to biotechnology. To use quantum dots in these fields, preferably, they have uniform diameters. Challenges for the applications include the development of technology that controls quantum dot size and arrangement.

A known technology that can control the size and arrangement of generated quantum dots is (3) a combination of MBE and a probe microscope for those quantum dots produced by one of the methods (Fujitsu Corp.; see "Proceeding of International Conference on the Physics of Semiconductors 2002").

However, with this conventional technology, it is difficult to manipulate a large number of generated quantum dots efficiently.

Specifically, methods (1) and (2) are hardly capable of controlling the variations in the diameter of a large number of generated quantum dots to a value on the order of a few percent or less which is required for optical applications of quantum dots.

In method (3), MBE is used in combination with a probe microscope. An advantage of the method is that nanometer-sized quantum dots can be directly produced by manipulating the probe. Each probe can however manipulate only one dot. No more than a few probes can be used at a time. The fastest probe microscope normally takes about 0.1 seconds to make a single scan. Assuming, as an example, a process time of 0.1 seconds for each dot and the simultaneous use of 10 probes, about 100 dots can be processed in one second. This translates into the need for a fairly extended period of time if one wants to control variations in diameter of numerous quantum dots with method (3). The process efficiency is low.

The present invention, conceived in view of these issues, has an objective to provide a semiconductor quantum dot manipulating method and production/manipulation apparatus capable of controlling the size of a large number of generated semiconductor quantum dots to a value on the order of a few percent or less which is required for optical applications of the dots.

DISCLOSURE OF INVENTION

The inventors of the present invention have diligently worked in order to accomplish the objective. The inventors have paid close attention to the fact that quantum dots with different quantum mechanical uniqueness are optically manipulable by exploiting (1) radiation force which is much more intense (difference can reach three to four orders of magnitude) when light is resonant with the transition energy of an electron in nanosubstance than when it is out of resonance and (2) different radiation forces experienced by individual quantum dots under light irradiation because of the different quantum mechanical uniqueness of the dots, which has led to the completion of the invention.

The quantum dot manipulating method in accordance with the present invention is characterized in that light is shone onto quantum dots directly generated in superfluid helium to manipulate the quantum dots in the superfluid helium.

The quantum dot manipulating method is preferably such that the quantum dots are generated by laser sputtering (laser ablation) in superfluid helium. The light shone onto the quantum dots is preferably at least one type of laser. More preferably, the laser has frequencies which overlap at least one of frequency ranges, each range being of twice the full width at half maximum for a peak in a frequency spectrum of radiation force exerted on the quantum dots. If multiple types of lasers are used, the lasers preferably have mutually different frequencies overlapping the frequency ranges and/or mutually different propagation directions and shapes. Preferably, quantum dots are repeatedly generated in the superfluid helium by laser sputtering. The quantum dot may be generated by repeatedly carrying out laser sputtering on quantum dots generated by laser sputtering and be smaller in size than the quantum dots.

The quantum dot manipulating method is preferably such that light is shone onto the quantum dots to integrate and/or fix the quantum dots onto a substrate.

The quantum dot manipulating method is preferably such that the quantum dots are made from a metal, a semiconductor, or an organic compound. Specifically, as an example, the semiconductor is a I-VII compound semiconductor. More specifically, the semiconductor is copper halide.

The quantum dot production/manipulation apparatus in accordance with the present invention is characterized in that it includes: a housing having an internal space to enable quantum dot generation and manipulation; a solid object holding section, provided inside the housing, to hold a solid object of a quantum dot material; and a dot production laser source shining a laser onto a solid object held in the solid object holding section to generate quantum dots by laser sputtering; and a dot manipulation laser source shining a laser onto the generated quantum dots to manipulate the quantum dots. The apparatus is further characterized in that the housing is adapted to hold superfluid helium in the internal space.

The quantum dot production/manipulation apparatus is preferably such that the dot manipulation laser source emits light which has frequencies which overlap at least one of frequency ranges, each range being of twice the full width at half maximum for one of peaks in a frequency spectrum of radiation force exerted on the quantum dots which correspond to the resonance frequencies of electronic transition and/or of Mie scattering modulated by electronic transition, etc. The dot manipulation laser source is preferably adapted to emit light with sufficient power to exert radiation force by which the quantum dots are halted from falling under gravity in the superfluid helium. The housing preferably contains therein a substrate to which the quantum dots manipulated with the light emitted from the dot manipulation laser source are integrated and/or fixed. The housing may be a helium cryostat.

Additional objects, advantages and novel features of the invention will be set forth in part in the description which follows, and in part will become apparent to those skilled in the art upon examination of the following or may be learned by practice of the invention.

BEST MODE FOR CARRYING OUT THE INVENTION

Figure 1:
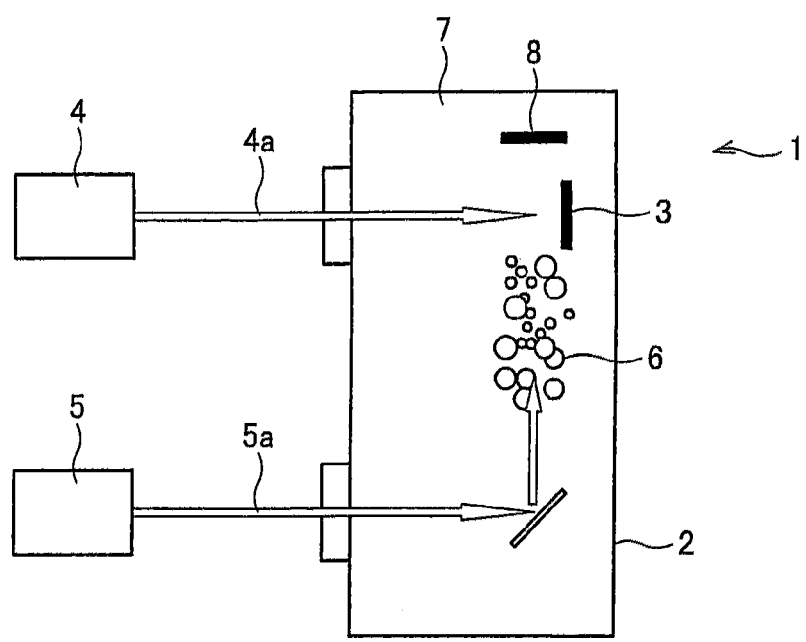
FIG. 1 is an illustration of the basic structure of a quantum dot production/manipulation apparatus in accordance with the present invention.

An embodiment of the present invention will be described in reference to FIG. 1. The present invention is by no means limited to the embodiment.

I. Quantum Dot Manipulating Method in Accordance with the Present Invention

According to the quantum dot manipulating method in accordance with the present invention, light is shone on quantum dots directly produced in superfluid helium to manipulate the quantum dots.

Quantum Dot

The quantum dot in the context of the present invention is any structure of a semiconductor, metal, organic compound, or like material, typically a few to a few hundred nanometers in size, which is a system where quantum mechanical effects can happen. In the embodiment detailed later, a semiconductor is used. Semiconductors are suitable because, among other reasons, they have inside thereof electronic systems such as excitons with very sharp resonant structure from which strong radiation force is presumably obtainable under a laser at corresponding frequencies.

Examples of such semiconductors include I-VII compound semiconductors, II-VI compound semiconductors, III-V compound semiconductors, and silicon (Si). However, any semiconductor may be used. The I-VII compound semiconductor is, for example, a copper compound, such as CuCl, CuBr, or CuI (especially, copper halide). The II-VI compound semiconductor is, for example, a cadmium compound, such as CdS or CdSe, or a zinc compound, such as ZnO. The III-V compound semiconductor is, for example, a gallium compound, such as GaAs.

Preferred among these compounds are I-VII and II-VI compounds. I-VII compounds are thought to exhibit strong effects. Generally, in the semiconductor, a hole combines with an electron to produce an exciton, an example of the resonance energy level. The unique energy of an exciton is dependent on a quantum dot size. This effect is exploitable: by selecting a laser which has a resonant wavelength with quantum dots with a particular size, one can select only quantum dots of that size.

Quantum Dot Production

According to the manipulating method in accordance with the present invention, quantum dots are produced in superfluid helium. The superfluid helium here refers to helium that has a temperature as extremely low as 2 K or even lower, so high a thermal conductivity that heat can readily dissipate, and so low a viscosity that particles in the helium diffuse hardly and meet very low viscosity resistance. By producing quantum dots in the superfluid helium, resonance changes are prevented which would otherwise occur due to a rise in temperature of the quantum dot under light irradiation. The resonance is an important factor in quantum dot manipulation (detailed later). Temperature rise in the quantum dot is preferably avoided to achieve efficient induction of resonance. Furthermore, the superfluid helium, since being in a superfluid state, allows generated quantum dots to move with little resistance.

Quantum dots are produced in superfluid helium. Preferably, laser sputtering is used to produce the quantum dots. There are however no particular limitations on how they should be produced. Laser sputtering is sputtering involving the use of a laser. A laser is shone onto a surface of a solid so that the sample discharges shallow parts of the solid.

In the present invention, a laser ("dot production laser" for convenience) is shone onto a solid which is a material from which quantum dots will be produced. The dot production laser is absorbed by the solid, melting and causing other changes to the solid so that quantum dots of various diameters are discharged from the solid. The laser sputtering is able to produce a large number of quantum dots.

The solid can be a solid object of any quantum dot material. There are no particular limitations on its shape, size, etc. The solid is preferably a crystal solid. The quantum dot material is preferably a semiconductor as mentioned earlier. The crystal solid therefore can be a crystal of the various compounds listed above.

In the present invention, it is preferable to repeatedly produce quantum dots in superfluid helium by laser sputtering. By doing so, not only a large number of quantum dots can be produced in the solid, but those quantum dots with apparently greater diameters than desired can be subjected to the sputtering laser again. As a result, the quantum dots can be divided further to create those with smaller diameters. In other words, the quantum dot size is efficiently controlled. The quantum dots with great diameters in this context, although not limited in any particular manner, normally refer to those with an average diameter of 100 nm or greater.

In the present invention, the laser sputtering explained above is carried out in superfluid helium. Helium is a typical inactive gas and prevents oxidation of quantum dot surfaces and other inconveniences from occurring immediately after the production of the quantum dots by the laser sputtering. Accordingly, degradation of the quantum dot surfaces can be restrained.

The dot production laser may be any laser, provided that the laser has wavelengths in the region the target solid can absorb. A suitable laser that matches the type of the solid (i.e., quantum dot material) can be selected from publicly known ones. A preferred example is a Q-switched Nd:YAG laser.

Laser intensity is sufficient if the solid dissolves and decomposes. Specifically, a few hundred microjoules to a few hundred millijoules, as an example, is preferred. Laser intensity in this range dissolves and decomposes the solid in a satisfactory manner and produces quantum dots efficiently. For example, when a Q-switched Nd:YAG laser is selected as the dot production laser, the laser can be converted to a wavelength region the target solid can absorb using, for example, harmonic generation.

Quantum Dot Manipulation

The quantum dots generated as above show a very diverse size distribution. Therefore, for optical applications of the generated quantum dots, the diameters of the quantum dots need to be rendered uniform. In the manipulating method in accordance with the present invention, light is shone onto the generated quantum dots to manipulate the quantum dots with light for size selection. The light shone is a laser. For convenience and clarity, the laser for use in dot manipulation will be called the dot manipulation laser to distinguish it from the dot production laser introduced earlier.

It was considered extremely difficult to produce enough force to allow manipulation of quantum dots with light. Few theoretical proposals, not to mention experiments, were made as to substance manipulation with light at the nanoscale level.

A group of researchers, which includes the inventors of the present invention, has however made a theoretical proposal that quantum dots with different quantum mechanical uniqueness become manipulable with light by exploiting that (1) radiation force is much more intense (difference can reach three to four orders of magnitude) when light is resonant with the transition energy of an electron in nanosubstance than when it is out of resonance and (2) individual quantum dots (especially, semiconductor quantum dots) experience different radiation forces from light because of different quantum mechanical uniqueness of the dots. A patent application has been already filed for theory (2) as Japanese Unexamined Patent Publication (Tokukai) 2003-200399 (published on Jul. 15, 2003). The idea behind theory (2) is indeed unique and never existed before. To realize it, the nanosubstance is ideally placed in a free space in a low temperature environment where resonance structure does not change.

Accordingly, in the present invention, quantum dots are directly produced in an extremely low-temperature (2 K or lower), very high-thermal-conductivity environment (superfluid helium). The generated quantum dots are then exposed to light to enable manipulation of the quantum dots. Hence, resonance changes are prevented which would otherwise occur due to a rise in temperature of the quantum dot. Furthermore, the dot is surrounded by a superfluid state. The quantum dot can move hardly being affected by diffusion and meeting little resistance. Therefore, the present invention provides a method which never existed before that enables manipulation of substance (e.g., control of nano particle size and arrangement) at the nanoscale level.

According to the present invention, quantum dots are manipulated in the same superfluid helium environment as they are produced. By manipulating quantum dots in the foregoing superfluid helium, resonance changes are prevented which would otherwise occur due to a rise in temperature of the quantum dots under light irradiation. The resonance is an important factor in quantum dot manipulation with a manipulation laser. Temperature rise in the quantum dot needs to be avoided as much as possible to achieve induction of marked resonance. Furthermore, the superfluid helium, since being in a superfluid state, allows generated quantum dots to move with little resistance.

By shining light onto the quantum dot, a radiation force is exerted from the light to the quantum dot, which enables quantum dot manipulation. The radiation force which acts on the quantum dot under light irradiation is determined by the scattering of light by the quantum dot, the transfer of momentum to the quantum dot which occurs through the absorption of light, and the potential energy felt by the electrical polarization of the quantum dot from the gradient of an electric field generated by the shining light. Generally, the greater the induced polarization of the quantum dot under light irradiation, the greater the radiation force acting on the dot. Therefore, to manipulate the quantum dot by shining light onto it, the polarization induced by the light needs to be increased, which in turn increases the force exerted on the quantum dot.

The magnitude of the quantum dot polarization induced under light irradiation is dependent on the size and permittivity of the quantum dot: when the object is larger in size and the permittivity is higher, the quantum dot scatters and absorbs more light, the electric field gradient is steeper, and the induced polarization is greater. As a result, the force acting on the quantum dot grows larger.

In contrast, when the object is smaller in size and the permittivity is lower, the dot scatters and absorbs less light, and the electric field gradient is milder. This translates into less induced polarization occurring in the quantum dot under light irradiation, hence a weaker force acting on the quantum dot. The light-dot interaction is very weak, because the nanoscale quantum dot is smaller than the wavelength of the laser normally used in optical manipulation. The light exerts only a weak force on the quantum dot, which makes it difficult to capture and arrange the quantum dot.

Therefore, in the present embodiment, to increase the induced polarization of the quantum dot under light irradiation, a commonly used laser is used to shine, onto the quantum dot, focused light with energy equal to a difference between energy levels of an electron which is unique to the substance.

The energy level of an electron is, as mentioned earlier, the energy level of an electron in the quantum dot in the context of quantum mechanics. In the quantum dot, energy levels are discrete.

Accordingly, the light that is resonant with an electron's energy level (hereinafter, "resonant light") is defined as a laser at frequencies which partially or entirely cover a frequency range having a width twice or less the full width at half maximum for the peak in a frequency spectrum of the radiation force enhanced by the resonance effect. The peak of radiation force, although not limited in any particular manner, can be a peak of radiation force by an electron transition, a peak of radiation force by Mie scattering modulated by an electron transition, or a peak by Mie scattering.

As resonant light hits the quantum dot, greater polarization is induced in the quantum dot because of the resonance with an electron energy level difference in the quantum dot. Generally, the interaction between light and a quantum dot increases with an increase in the induced polarization of the quantum dot. The resonant incident light increases the induced polarization of the quantum dot, which in turn increases mechanical interaction between the light and the quantum dot. Therefore, the quantum dot scatters and absorbs more of the incident resonant light with energy transferred efficiently from the resonant light to the quantum dot.

By shining, onto the quantum dot, resonant light with energy equal to an electron energy level difference which is unique to the quantum dot as mentioned above, the interaction between the quantum dot and the light increases, which in turn adds to the force acting on the quantum dot. Thus, the force is increased in absolutely unconventional, unknown manner, through the exploitation of electron energy levels. In addition, with the optical manipulation technology involving resonant light, the nanoscale quantum dot where the light-dot interaction is very weak becomes manipulable. Furthermore, through the light resonance, the quantum dot becomes manipulable with a laser at 1.0 to 4.0 eV (which covers laser frequencies commonly used for optical manipulation) and at lower power of about 50 µW/100 µm².

When the quantum dot material is known, the wavelength of the resonant light shone can be determined from the electron energy levels given in documents (for example, "Longitudinal and Transverse Components of Excitons in a Spherical Quantum Dot", H. Ajiki and K. Cho, Phys. Rev. B, Vol. 62, p. 7402-7412 (2000), H. Ajiki, T. Tsuji, K. Kawano, K. Cho, Phys. Rev. B, Vol. 66, 245322-p. 1-12 (2002), and T. Iida, H. Ishihara, Phys. Rev. Lett. Vol. 90, 057403-p. 1-4 (2003)). In addition, as will be detailed later, the electron energy level of a quantum dot changes with the quantum dot size, and so does the transition energy. Therefore, when the material, size, shape, internal structure, etc. of the quantum dot to be manipulated is unknown, the electron energy level difference in the quantum dot, as well as the size, shape, internal structure, etc. of the quantum dot, are preferably determined by spectrometry or another technique, with the measurements being used to determine the wavelength of resonant light.

Furthermore, resonant light emission should be focused approximately to the wavelength level before being introduced to the quantum dot. The width of the spectrum of the resonant light should be set up to be resonant with the electron energy level of the quantum dot to be manipulated. For example, to manipulate CuCl quantum dots by the foregoing method, the near-ultraviolet region of light is used in which there exists electron excitation resonance in CuCl. Specifically, a blue-violet semiconductor laser element with a wavelength of 385±1 nm, an output of 3 mW, and a line width of 0.05 nm may be used. Alternatively, the second harmonic of a Ti-Sapphire laser with a wavelength of 360 to 420 nm, an output of 1 to 30 mW, and a line width of 1 to 100 nm may be used.

Since the resonance of light under consideration here is resonance with an electron energy level unique to the quantum dot, light (resonant light) with energy equal to an electron energy level difference of the quantum dot may be shone to manipulate the quantum dot by means of resonance. The nanoscale quantum dot, which exhibits weak interaction with light, becomes manipulable under light irradiation by exploiting the resonance, even if the quantum dot, without exploiting resonance, receives a very weak force from the light.

The quantum dot may be anything that has an electron energy level. Its size, although not limited in any particular manner, is preferably such that the force increases appreciably by the resonance of light with an electron energy level. Specifically, the diameter of the quantum dot is preferably at the nanoscale level, more preferably, 100 nm or less, for the following reasons. If the radius of the quantum dot is 100 nm or less, the force acting on the quantum dot, in the presence of light resonance, increases by $10^2$ to $10^5$ times over the force in the absence of light resonance.

The quantum dots manipulable by exploiting light resonance are only those which have an electron energy level difference equal to the energy of the light shone (hereinafter, "resonant quantum dot").

When light is shone, no resonance occurs with the quantum dots which do not have an electron energy level difference corresponding to the energy of the light shone ("non-resonant quantum dot," for convenience). The force acting on the non-resonant quantum dot does not increase. In this manner, the resonance of light with the electron energy level unique to the quantum dot to be manipulated is utilized; only the resonant quantum dots can be selectively manipulated.

Furthermore, if the quantum dot radius changes on the order of 1 nm, the electron energy levels of the quantum dot varies as a result of quantum effects, and the frequency of the resonant light also changes very sensitively. In other words, quantum dots of the same material may exhibit different resonant light frequencies if the quantum dots differ in at least one factor: size, shape, or internal structure. This nature is exploitable: selections can be made on the order of 1 nm from quantum dots of the same material, but different in at least one of size, shape, and internal structure, by changing resonant light frequency.

Furthermore, only certain quantum dots can be integrated on a substrate from a group of different kinds of quantum dots made of a particular material, but differing in at least one of size, shape, and internal structure. The quantum dot integration on a substrate enables a large number of generated and manipulated quantum dots to be removed together with a substrate from a manipulation environment (specifically, from the superfluid helium). Quantum dots can be also fixed onto a substrate. Fixing quantum dots onto a substrate enables the quantum dots to be removed together with the substrate from a manipulation environment, as with the integrated quantum dots. If the substrate is provided with holes or grooves in advance for use in manipulation, quantum dots can be arranged on the substrate. Therefore, optical elements become fabricable from, for example, photonic crystals, containing nanoscale quantum dots with substantially the same size, shape, and internal structure. It also becomes possible to efficiently manipulate quantum dots of biomolecules and organic compounds.

"Substantially the same" size, shape, and internal structure is defined to meant that the size, shape, and internal structure are similar to the extent where the quantum dot are manipulable under light irradiation. In other words, quantum dots which have an electron energy level in resonance with light shone are regarded as having substantially the same size, shape, and internal structure.

The greater the interaction with light, the greater force the quantum dot receives from the light shone. Therefore, if the crystal of resonant quantum dots is not clean, resonance becomes weaker, exerting weaker force on the resonant quantum dots. Therefore, only clean crystal-forming, high quality resonant quantum dots can be selectively manipulated.

The electron energy level of the quantum dot can be made to show a very narrow line width by manipulating such quantum dots in superfluid helium. The line width of an electron energy level of the quantum dot here refers to the width of one energy state itself of the quantum dot. Generally, the line width of a state of an electron is affected by the temperature of the quantum dot and its surroundings. At high temperature, the atoms in the quantum dot and those in the surroundings are rapidly moving. Electrons in the quantum dot are affected by the movement, and the quantum dot comes to show energy levels with some width. Since the integrated intensity is constant, the peak level falls. Therefore, the quantum dot can remain at extremely low temperature (about 2 K) even when irradiated with a laser, which narrows down the energy level of the quantum dot and increases the peak level. The narrowing of the line width of the electron energy level to a very low level makes it possible to clearly tell whether or not there is resonance.

Therefore, by maintaining quantum dots at extremely low temperature and narrowing the line width of electron energy level, and by using a manipulation laser with a narrow line width of the peak on the frequency spectrum, only the quantum dots which has matched resonance energy can be effectively selected.

According to the method, since the quantum dots are irradiated with light matched with an electron energy level difference, the light shone is in resonance with an electron energy level of the quantum dots. Therefore, even if the quantum dot, without exploiting resonance, exhibits weak mechanical interaction with light, the mechanical interaction between light and the quantum dot is increased because the light shone is in resonance with an electron energy level of the quantum dot. As a result, the laser exerts increased force to the quantum dot. Shining the resonance light thus readily enables manipulation of quantum dots.

Since the force acting on the quantum dot is increased for manipulation by exploiting the resonance of the laser in a commonly used wavelength region, the quantum dot can be manipulated by shining weak light. Therefore, the quantum dot can be manipulated with a laser at commonly used wavelengths. Nanoscale quantum dots can be manipulated with light, which was conventionally considered difficult.

The dot manipulation laser is set to such an intensity that the laser shone does not lead to destruction of the quantum dot.

II. Quantum Dot Production/Manipulation Apparatus in Accordance with the Present Invention The quantum dot production/manipulation apparatus in accordance with the present invention is characterized in that it includes: a housing having an internal space to enable quantum dot generation and manipulation; a solid object holding section, provided inside the housing, to hold a solid object of a quantum dot material; a dot production laser source shining a laser onto a solid object held in the solid object holding section to generate quantum dots by laser sputtering; and a dot manipulation laser source shining a laser onto the generated quantum dots to manipulate the quantum dots. The apparatus is further characterized in that the housing is adapted to hold superfluid helium in the internal space.

By using the quantum dot production/manipulation apparatus arranged as above, quantum dots can be generated and manipulated in superfluid helium which exhibits very high thermal conductivity and extremely low temperature (2 K or below). The quantum dot production/manipulation apparatus can prevent a rise in temperature of the quantum dots from changing resonance. Since the helium is in a superfluid state, the dots are manipulable with little resistance.

The quantum dot production/manipulation apparatus in accordance with the present invention is preferably such that the dot manipulation laser source emits light in resonance with an electron energy level of the quantum dots.

The light shone is resonance with an electron energy level of the quantum dots. A quantum dot which, without exploiting resonance, exhibits weak mechanical interaction with light exhibits increased mechanical interaction with the light that is in resonance with an electron energy level of the quantum dots. As a result, the laser exerts an increased force on the quantum dots. Shining resonant light thus readily enables manipulation of the quantum dots.

Since the radiation force acting on the quantum dots is increased for manipulation by exploiting the resonance of the laser, the quantum dots can be manipulated by shining weak light. Therefore, the quantum dots can be manipulated with a laser at commonly used wavelengths. The quantum dot production/manipulation apparatus can manipulate nanoscale quantum dots with light, which was conventionally considered difficult.

The dot manipulation laser source is preferably adapted to emit light with sufficient power to exert radiation force of which movement of the quantum dots is controllable to halt the quantum dots from falling, reduce speed, capture, transport, etc.

Accordingly, the quantum dot production/manipulation apparatus in accordance with the present invention is able to choose those quantum dots which are in resonance with the radiation force of the dot manipulation laser.

If quantum dots are made from the same material, but differ in at least one of size, shape, and internal structure, they exhibit different electron energy levels due to quantum effects. The quantum dots thus show different electron energy level differences. By shining light which is in resonance with a specific quantum dot electron energy level, only those particular quantum dots which have substantially the same size, shape, or internal structure can be selectively manipulated from a plurality of types of quantum dots which differ in at least one of size, shape, and internal structure. The use of the quantum dot production/manipulation apparatus enables to choose quantum dots which differ in size or shape on the order of 1 nm for manipulation.

In the housing, there is preferably provided a substrate to which the quantum dots manipulated with the light emitted from the dot manipulation laser source are integrated and/or fixed.

Accordingly, the quantum dots chosen using the dot manipulation laser can be removed from the housing together with the substrate. The substrate may be made of a substance (material) selectable in accordance with the binding force of the quantum dots. If after being removed from the housing, the quantum dots are separated from the substrate for later use, the substrate should be made of a material which exhibits a weak binding force. In contrast, if the quantum dots are used as they are integrated and/or fixed onto the substrate, the substrate should be made of a material which exhibits a strong binding force. Examples include semiconductors, such as Si and GaAs, metals, organic compounds, and insulators, such as glasses and sapphire.

The housing is preferably a helium cryostat.

Accordingly, the quantum dot production/manipulation apparatus in accordance with the present invention can be built around an existing helium cryostat. The quantum dot production/manipulation apparatus can be fabricated on an existing helium cryostat production line. The apparatus is manufactured at low cost and improved efficiency.

FIG. 1 is a schematic of a quantum dot production/manipulation apparatus 1 of the present embodiment. The quantum dot production/manipulation apparatus 1 includes a housing 2, a solid object holding section (not shown) holding a solid object 3, a dot production laser source 4, a dot manipulation laser source 5, and a substrate 8. The housing 2 contains superfluid helium 7 in its internal space.

The dot production laser source 4 emits a dot production laser 4a which enters the housing 2 and hits the solid object 3 held in the solid object holding section in the superfluid helium 7. The solid object 3 is made into particles by laser sputtering using the dot production laser 4a to generate quantum dots 6.

The dot manipulation laser source 5 emits a dot manipulation laser 5a at a wavelength which, as mentioned earlier, is in resonance with the quantum dots 6 generated by laser sputtering. The quantum dots 6 are optically manipulated by shining the dot manipulation laser 5a onto the quantum dots 6.

Specifically, the radiation force by the dot manipulation laser 5a halts the quantum dots 6 being pulled by gravity in the superfluid helium 7 from falling. The laser 5a halts the quantum dots 6, generated by laser sputtering and being pulled by gravity, which are in resonance with the dot manipulation laser 5a from falling.

Furthermore, the dot manipulation laser 5a is able to integrate and/or fix the quantum dots 6, halted from falling, onto the substrate 8 inside the housing 2. The substrate 8 is adapted so that it can be removed from the housing 2. Accordingly, those particular quantum dots 6 which are in resonance with the dot manipulation laser 5a can be selectively removed from the housing 2.

The following will describe the specific structure and positions of the dot production laser source 4 and the dot manipulation laser source 5.

The quantum dot production/manipulation apparatus 1 of the present embodiment, as mentioned earlier, generates quantum dots 6 by laser sputtering. The quantum dots 6 generated and discharged into superfluid helium falls under gravity in the superfluid helium 7. To select specific ones from the falling quantum dots 6, the dot production laser 4a in resonance with those specific quantum dots 6 is emitted, and the fall of the specific quantum dots 6 is halted by the radiation force of the dot manipulation laser 5a. To this end, the dot production laser source 4 is preferably positioned so that the dot production laser 4a is incident to an upper part of the housing 2 with respect to the direction of gravity, enabling the quantum dots generated by the dot production laser 4a to fall in the housing 2 under gravity. The dot manipulation laser source 5 is preferably adapted so that the dot manipulation laser 5a is incident to a lower part of the housing 2 against the direction of gravity, halting specific ones of the falling quantum dots from falling under gravity. In the present embodiment, the dot manipulation laser source 5 is placed on the same face of the housing 2 as the dot production laser source 4 so that the dot manipulation laser 5a enters the housing 2 and hits the specific quantum dots from below, opposite to the direction of gravity, to halt them from falling. This is however by no means limiting the present invention. A dot manipulation laser source may be provided as in a quantum dot production/manipulation apparatus 1' (FIG. 2) used in an example detailed later.

The dot manipulation laser 5a, as mentioned earlier, is resonant light, which has frequencies which overlap a frequency range twice the full width at half maximum for a peak of radiation force at a frequency corresponding to an electron transition in the quantum dot, Mie scattering modulated by an electron transition, etc. By shining the dot manipulation laser 5a, the mechanical interaction between the light and the quantum dots 6 is increased due to resonance with an electron energy level of the quantum dots 6. As a result, the dot manipulation laser 5a exerts a greater force onto the quantum dots 6, enabling easy manipulation of the quantum dots 6 with shining light.

There is literature (for example, T. Iida, H. Ishihara, Phys. Rev. Lett. Vol. 90, 057403-p. 1-4 (2003)) which teaches that if the electric field strength of incident light has a gradient, the quantum dot moves down along the gradient to where it is stable in terms of potential energy. The gradient of the electric field strength is caused by evanescent waves which occur when a laser is collected, light from light sources interferes, and light enters a low refractive index medium from a high refractive index medium at an angle greater than or equal to the critical angle. Thus, the quantum dots generated and manipulated with light by the quantum dot production/manipulation apparatus can be arranged in a pattern of high/low strength (optical lattice) which is generated by dividing a dot manipulation laser into two fluxes for interference, arranged by a combination of different light sources and moved without destroying the arrangement, and subjected to a selection according to more than one attributes (resonance energies, chirality, etc.) of a group of quantum dots simultaneously, using a combination of light sources having different frequencies and polarization.

Therefore, in the present embodiment, the quantum dots 6, halted from falling by the dot manipulation laser 5a, are integrated and/or fixed by the dot manipulation laser 5a onto the substrate 8 in the housing 2. To this end, the substrate 8 is positioned on the optical path of the dot manipulation laser 5a which extends upward, opposite to the direction of gravity, in the housing 2. This is however by no means limiting the present invention. The quantum dots 6, halted from falling by the dot manipulation laser 5a, may be integrated and/or fixed onto the substrate 8 using another light source. If another light source is used to integrate and/or fix the quantum dots 6 onto the substrate 8 in this manner, the substrate 8 may be disposed at a different position, giving more freedom in the disposition.

III. Applications of the Present Invention

The present invention is capable of generating nanoscale quantum dots and controlling the size and layout of the quantum dots in a good manner. The present invention is widely applicable in the fields of nanotechnology.

A specific example is quantum computing. To realize a quantum computer, 100 nm or smaller quantum dots need to be produced and their size and layout be precisely controlled. The present invention can control the size and layout of quantum dots in a good manner. It is expected that the present invention will contribute to the development of the technology to realize the quantum computer.

If a complex organic compound or biomolecular solid is used as the material for quantum dots, the invention is applicable for separation and analysis of the materials. The invention will also contribute to the development of micromachine and nanomachine materials. The radiation force by resonant light can be used to drive micromachines and nanomachines. Another application is the quantum dot laser material. Up to date, particle diameters were so diverse that narrowing was impossible. Effects were not improved as much as theoretical predictions. The quantum dots of the present invention, with uniform size, etc., enable a laser with very narrow line width and good oscillation efficiency.

The following will describe the present invention by way of concrete examples in more detail, which is not at all intended to be limiting the present invention.

EXAMPLES

Figure 2:
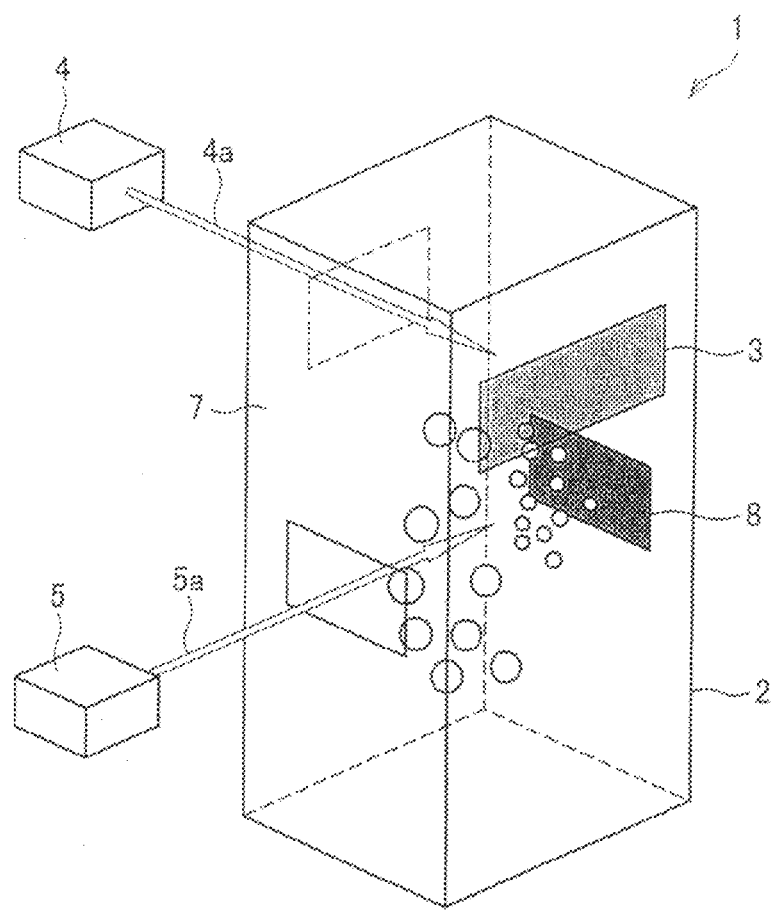
FIG. 2 is a see-through illustration of features of a quantum dot production/manipulation apparatus used in the present example.

The quantum dot production/manipulation apparatus 1' shown in FIG. 2 was used as a similar arrangement to the quantum dot production/manipulation apparatus 1 shown in FIG. 1. FIG. 2 is a see-through illustration of features of the quantum dot production/manipulation apparatus 1' used in the present example. In the quantum dot production/manipulation apparatus 1', the dot manipulation laser source 5 was placed beside the housing 2 so that the dot manipulation laser 5a' could be vertical to the dot production laser 4a as shown in FIG. 2. The substrate 8 was placed on the optical path of the dot manipulation laser 5a' which was vertical to the dot production laser 4a. The housing 2 was a helium cryostat (4×4×4 $cm^3$) filled with superfluid helium. The solid object 3 was CuCl. The dot production laser source 4 was Q-switched Nd:YAG laser (Quanta Ray GCR manufactured by Spectra Physics). The laser intensity was adjusted to 10 mJ. The dot manipulation laser source 5 was the second harmonic (wavelength 360 to 430 nm; output 30 mW; line width 0.3 eV) from a Ti-Sapphire laser (Femtosecond Titanium Sapphire Laser Tunami 3941-P5LC manufactured by Spectra Physics). The laser frequency was adjusted to 3.20 eV. The substrate 8 was a Si substrate. The dot production laser 4a hit a site on the solid object 3 which about 2 cm away from the substrate 8. The surface of the solid object 3 was about 1 mm away from the dot manipulation laser 5'. The quantum dot production/manipulation apparatus 1' set up as above was used to generate and manipulate CuCl quantum dots.

A scanning electron microscope image was produced of CuCi quantum dots produced and manipulated by the quantum dot production/manipulation apparatus 1'. The CuCi quantum dots were observed under a scanning electron microscope after being manipulated and fixed onto the substrate 8 by the dot manipulation laser 5a' in superfluid helium.

The image produced showed about 100-nm CuCl quantum dots. Smaller CuCl quantum dots than 100 nm were also fixed onto the substrate.

These observations confirm that the present invention is capable of selecting only quantum dots of desired size and enables the dots to be fixed to the substrate so that the dots can be removed from the manipulation environment.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention directly generates quantum dots in superfluid helium and manipulates the generated quantum dots by shining light onto the quantum dots. Since the manipulation is carried out in a low temperature environment (in superfluid helium) in this manner, resonance changes are prevented from occurring due to a rise in temperature of the quantum dot. Furthermore, the surroundings are in a superfluid state, the target quantum dot can move hardly being affected by diffusion and meeting little resistance.

The quantum dot production/manipulation apparatus in accordance with the present invention is adapted to generate quantum dots with a generation laser and manipulate the quantum dots with a manipulation laser in a housing containing superfluid helium in an internal space. Thus, the quantum dot generation and manipulation can be carried out in superfluid helium which has extremely low temperature (2 K or below) and very high thermal conductivity.

Therefore, by directly generating quantum dots and manipulating the quantum dots with light in superfluid helium, the size and layout of the quantum dots can be controlled by a method that never existed before.

The invention claimed is:

1. A quantum dot production/manipulation apparatus comprising:
a housing having an internal space to enable generation and manipulation of quantum dots producing a quantum effect, wherein the internal space is adapted to hold superfluid helium therein;
a solid object holding section, provided inside the superfluid helium in the housing, to hold a solid object of a quantum dot material;
a first and second laser source, comprising:
a dot production laser source irradiating, with a laser emitted to an inside of the housing, a solid object held in the solid object holding section, in the superfluid helium, to generate quantum dots in the superfluid helium by laser sputtering; and
a dot manipulation laser source irradiating, with a laser emitted to the inside of the housing, the generated quantum dots in the superfluid helium to manipulate the quantum dots.

2. The apparatus of claim 1, wherein the dot manipulation laser source emits light which has frequencies which overlap at least one of frequency ranges, each range being of twice the full width at half maximum for one of peaks in a frequency spectrum of radiation force exerted on the quantum dots which correspond to the resonance frequencies of electronic transition and/or of Mie scattering modulated by electronic transition, etc.

3. The apparatus of claim 1, wherein the dot manipulation laser source is adapted to emit light with sufficient power to exert radiation force of which movement of the quantum dots is controllable by the radiation force to halt the quantum dots from falling, reduce speed, capture, transport, etc.

4. The apparatus of claim 1, wherein the housing contains therein a substrate to which the quantum dots manipulated with the light emitted from the dot manipulation laser source are integrated and/or fixed.

5. The apparatus of claim 1, wherein the housing is a helium cryostat.

6. The quantum dot production/manipulation apparatus as set forth in claim 1, wherein:
the solid object holding section is provided in an upper part of the internal spacing, and is arranged so that the quantum dots which are generated by the laser sputtering downwardly fall in the superfluid helium;
the dot manipulation laser source upwardly shines the laser, from a lower part of the inner space, onto the quantum dots which downwardly falls, so as to halt some of the quantum dots from falling, reduce speed, capture, and transport.

7. The quantum dot production/manipulation apparatus as set forth in claim 1, wherein:
the dot production laser source causes generation of the quantum dots in the superfluid helium, wherein at least one of sizes, shapes, internal structures of the quantum dots is different from each other;
the dot manipulation laser source shines the laser onto the quantum dots in such a manner that a quantum dot in resonance with the laser is selected from the quantum dots and manipulated in the superfluid helium.

8. The quantum dot production/manipulation apparatus as set forth in claim 7, wherein:
a quantum dot that is in resonance with the laser and differs from the others of the quantum dots in size or shape on the order of 1 nm is selected from the quantum dots.

9. The quantum dot production/manipulation apparatus as set forth in claim 7, wherein:
the housing contains therein a substrate to which the quantum dots manipulated with the laser emitted from the dot manipulation laser source are integrated and/or fixed; and
the quantum dot in resonance with the laser is collected from the superfluid helium gas by integrating and/or fixing, to the substrate, the quantum dots manipulated with the laser emitted from the dot manipulation laser source.

10. The quantum dot production/manipulation apparatus as set forth in claim 9, wherein:
the substrate has a hole or a groove provided therein for use in manipulation of the quantum dot that is in resonance with the laser.

* * * * *